United States Patent
Sato (10) Patent No.: US 11,074,059 B2
(45) Date of Patent: Jul. 27, 2021

(54) NON-TRANSITORY COMPUTER-READABLE RECORDING MEDIUM STORING INSTRUCTIONS CONTROLLING OPERATION OF MOBILE TERMINAL

(71) Applicant: BROTHER KOGYO KABUSHIKI KAISHA, Aichi (JP)

(72) Inventor: Hirokazu Sato, Aichi (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/687,757

(22) Filed: Aug. 28, 2017

(65) Prior Publication Data
US 2018/0060063 A1 Mar. 1, 2018

(30) Foreign Application Priority Data
Aug. 30, 2016 (JP) .............................. JP2016-167700

(51) Int. Cl.
| | |
|---|---|
| *G06F 8/65* | (2018.01) |
| *G06F 8/654* | (2018.01) |
| *G06F 8/10* | (2018.01) |
| *H04L 29/08* | (2006.01) |

(52) U.S. Cl.
CPC .................. *G06F 8/65* (2013.01); *G06F 8/10* (2013.01); *G06F 8/654* (2018.02); *H04L 67/34* (2013.01)

(58) Field of Classification Search
CPC ....................................................... H04L 67/34
See application file for complete search history.

(56) References Cited

U.S. PATENT DOCUMENTS

| | | | | |
|---|---|---|---|---|
| 6,467,087 B1 * | 10/2002 | Yang | .......................... | G06F 8/65 |
| | | | | 717/168 |
| 6,832,373 B2 * | 12/2004 | O'Neill | ................... | G06F 8/654 |
| | | | | 717/171 |
| 7,146,609 B2 * | 12/2006 | Thurston | ................... | G06F 8/65 |
| | | | | 717/169 |

(Continued)

FOREIGN PATENT DOCUMENTS

| | | |
|---|---|---|
| JP | 2001-230892 A | 8/2001 |
| JP | 2012-128571 A | 7/2012 |

*Primary Examiner* — S. Sough
*Assistant Examiner* — Zheng Wei
(74) *Attorney, Agent, or Firm* — Scully Scott Murphy and Presser (57) ABSTRACT

A non-transitory computer-readable recording medium storing instructions which cause, when executed by a controller, a mobile terminal to execute a first receiving process of receiving second version information from an image processing device and first version information concerning a firmware for update from the server, a displaying process of displaying update information when the firmware of the image processing device can be updated a second receiving process of receiving the second version information from the image processing device, a determining process of determining whether the firmware installed in the image processing device is updated to a newer version based on one of the first and second version information received in the first receiving process, and the second version information received in the second receiving process, and a hiding process of hiding the update information when it is determined that the firmware has been updated in the determining process.

9 Claims, 6 Drawing Sheets

(56) References Cited

U.S. PATENT DOCUMENTS

| | | | | |
|---|---|---|---|---|
| 7,715,834 | B2* | 5/2010 | Hibino | H04W 28/18 455/41.2 |
| 7,770,165 | B2* | 8/2010 | Olson | G06F 9/44589 717/168 |
| 8,621,053 | B2* | 12/2013 | Fukata | G06F 8/65 709/203 |
| 8,701,100 | B2* | 4/2014 | Jung | G06F 8/65 717/170 |
| 8,799,459 | B2* | 8/2014 | Hassan | H04W 76/10 709/224 |
| 8,804,172 | B2* | 8/2014 | Ichikawa | G06F 3/1204 358/1.13 |
| 9,430,723 | B1* | 8/2016 | Panda | G06F 3/12 |
| 9,619,221 | B2* | 4/2017 | Nishikawa | G06F 8/65 |
| 2002/0091547 | A1* | 7/2002 | Ohe | G06F 8/65 705/2 |
| 2003/0142351 | A1* | 7/2003 | Sakura | G06F 8/65 358/1.15 |
| 2003/0217193 | A1* | 11/2003 | Thurston | G06F 8/65 719/321 |
| 2004/0070610 | A1* | 4/2004 | Tanimoto | H04L 41/0816 715/751 |
| 2005/0144616 | A1* | 6/2005 | Hammond | G06F 8/65 717/173 |
| 2007/0288423 | A1* | 12/2007 | Kimoto | G06F 8/65 |
| 2008/0120610 | A1* | 5/2008 | Katano | G06F 8/65 717/168 |
| 2008/0288935 | A1* | 11/2008 | Kawaguchi | G06F 8/65 717/172 |
| 2009/0235242 | A1* | 9/2009 | Kawaguchi | H04N 1/00002 717/168 |
| 2011/0023021 | A1* | 1/2011 | Miyazaki | G06F 8/658 717/168 |
| 2011/0047536 | A1* | 2/2011 | Santos | G06F 8/71 717/170 |
| 2011/0069341 | A1* | 3/2011 | Kim | G06F 3/1204 358/1.15 |
| 2011/0072423 | A1* | 3/2011 | Fukata | G06F 8/65 717/172 |
| 2011/0239208 | A1* | 9/2011 | Jung | G06F 8/65 717/170 |
| 2012/0044534 | A1* | 2/2012 | Ichikawa | G06F 3/1204 358/1.15 |
| 2012/0062948 | A1* | 3/2012 | Nishikawa | G06F 3/1203 358/1.15 |
| 2012/0167071 | A1* | 6/2012 | Paek | G06F 8/65 717/170 |
| 2013/0067065 | A1* | 3/2013 | Navasivasakthivelsamy | H04L 12/2809 709/224 |
| 2013/0067068 | A1* | 3/2013 | Hassan | H04W 76/10 709/224 |
| 2013/0227540 | A1* | 8/2013 | Ruster | G06F 8/65 717/170 |
| 2014/0047430 | A1* | 2/2014 | Kanematsu | G06F 8/65 717/170 |
| 2014/0059536 | A1* | 2/2014 | Hiratsuka | G06F 8/61 717/178 |
| 2014/0137096 | A1* | 5/2014 | Ueda | G06F 8/65 717/171 |
| 2014/0143768 | A1* | 5/2014 | Kazalski | G06F 8/60 717/171 |
| 2014/0298310 | A1* | 10/2014 | Iijima | G06F 8/654 717/170 |
| 2015/0347121 | A1* | 12/2015 | Harumoto | H04L 67/2871 717/172 |
| 2016/0226953 | A1* | 8/2016 | Ishino | H04L 67/10 |
| 2016/0350100 | A1* | 12/2016 | Folske | G06F 8/654 |
| 2019/0138297 | A1* | 5/2019 | Wu | G06F 16/958 |
| 2019/0179627 | A1* | 6/2019 | Sugiyama | G06F 8/654 |

* cited by examiner

NON-TRANSITORY COMPUTER-READABLE RECORDING MEDIUM STORING INSTRUCTIONS CONTROLLING OPERATION OF MOBILE TERMINAL

CROSS-REFERENCE TO RELATED APPLICATIONS

This application claims priority under 35 U.S.C. § 119 from Japanese Patent Application No. 2016-167700 filed on Aug. 30, 2016. The entire subject matter of the application is incorporated herein by reference.

BACKGROUND

Technical Field

The present disclosures relate to a non-transitory computer-readable recording medium storing instructions which cause, when executed by a controller, a mobile terminal to transmit operational instructions to an image processing device.

Related Art

Recently, mobile terminals such as smartphones and tablets have spread rapidly. Among such mobile terminals, there has been known a mobile terminal configured to transmit instructions regarding image processing to an image processing device. In such a mobile terminal, when firmware of the image processing device can be updated, an update information notifying that the firmware of the image processing device can be updated is typically displayed on a display of the mobile terminal. As the user performs a certain operation in response to the displayed update information, an updating instruction is transmitted from the mobile terminal to the image processing device, and updating of the firmware is executed in the image processing device. It is noted that whether update of the image processing device can be executed or not may be determined, for example, by a server, and the server may transmit determination information representing a determination result to the mobile terminal so that the mobile terminal makes use of the determination information.

SUMMARY

According to a conventional method as described above, the firmware of the image processing device has been updated or not is checked based on results of inquiries transmitted from the mobile terminal to both the image processing device and the server.

Specifically, according to the conventional method, an inquiry concerning the current version information is transmitted from the mobile terminal to the server, and an inquiry concerning update is transmitted from the mobile terminal to the server every time when a certain period has elapsed. Therefore, when the update of the firmware has been executed in the image processing device, the mobile terminal receives the version information of the updated firmware from the image processing device as a replay to the inquiry. Thereafter, when the version information received from the image processing device is transmitted to the server, the server determines that the firmware of the image processing device has been updated to the latest version, and transmits information indicating a determination result. If the firmware of the image processing device has not been updated, an update notification notifying that the firmware can be updated is typically displayed.

To the server, however, a plurality of inquiries may be transmitted from a plurality of mobile terminals. Therefore, if the period for transmitting such inquiries to both the image processing device and the server is relatively short (e.g., 30 seconds), load to the server may be excessively large and an appropriate communication between the mobile terminal and the server may not be ensured. On the other hand, if the period for transmitting the inquiries to both the image processing device and the server is relatively long (e.g., one week), a period for checking necessity of update becomes too long.

Therefore, it is preferable that communication frequency between the mobile terminals and the server is as small as possible. If the communication frequency between the mobile terminals and the server is lessened, however, whether the firmware of the image processing devices has been updated is determined less frequently. In such a case, the update notification will be kept displayed until the communication between the mobile terminal and the server is executed again.

According to aspects of the disclosures, there is provided a non-transitory computer-readable recording medium storing instructions controlling operation of a mobile terminal having a controller, a display and a communication interface configured to communicate with an image processing device and a server, the server storing first version information concerning a version of a firmware of the image processing device for update, the mobile terminal being configured to transmit an instruction concerning image processing to the image processing device through the communication interface. The instructions cause, when executed by the controller, the mobile terminal to execute a first receiving process of receiving second version information concerning a version of the firmware installed in the image processing device from the image processing device through the communication interface and the first version information from the server through the communication interface, a displaying process of displaying update information indicating that the firmware of the image processing device can be updated when it is determined that the firmware of the image processing device can be updated based on the first version information received from the server, a second receiving process of receiving the second version information from the image processing device through the communication interface, a determining process of determining whether the firmware installed in the image processing device is updated to a newer version with respect to a version represented by the second version information received in the first receiving process based on one of the first version information and the second version information received in the first receiving process, and the second version information received in the second receiving process, and a hiding process of hiding the update information displayed on the display in the displaying process when it is determined that the firmware has been updated in the determining process.

According to aspects of the disclosures, there is provided a mobile terminal including a display, a communication interface configured to communicate with an image processing device and a server, the server storing first version information concerning a version of a firmware of the image processing device for update, the mobile terminal being configured to transmit an instruction concerning image processing to the image processing device through the communication interface, a controller and a non-transitory recording medium storing computer-readable instructions.

The instructions, when executed by the controller, causes the mobile terminal to perform a first receiving process of receiving second version information concerning a version of the firmware installed in the image processing device from the image processing device through the communication interface and the first version information from the server through the communication interface, a displaying process of displaying update information indicating that the firmware of the image processing device can be updated when it is determined that the firmware of the image processing device can be updated based on the first version information received from the server, a second receiving process of receiving the second version information from the image processing device through the communication interface, a determining process of determining whether the firmware installed in the image processing device is updated to a newer version with respect to a version represented by the second version information received in the first receiving process based on one of the first version information and the second version information received in the first receiving process, and the second version information received in the second receiving process, and a hiding process of hiding the update information displayed on the display in the displaying process when it is determined that the firmware has been updated in the determining process.

According to aspects of the disclosures, there is provided a method of controlling an operation of a mobile terminal having a display and a communication interface configured to communicate with an image processing device and a server, the server storing first version information concerning a version of a firmware of the image processing device for update, the mobile terminal being configured to transmit an instruction concerning image processing to the image processing device through the communication interface. The method executes a first receiving process of receiving second version information concerning a version of the firmware installed in the image processing device from the image processing device through the communication interface and the first version information from the server through the communication interface, a displaying process of displaying update information indicating that the firmware of the image processing device can be updated when it is determined that the firmware of the image processing device can be updated based on the first version information received from the server, a second receiving process of receiving the second version information from the image processing device through the communication interface, a determining process of determining whether the firmware installed in the image processing device is updated to a newer version with respect to a version represented by the second version information received in the first receiving process based on one of the first version information and the second version information received in the first receiving process, and the second version information received in the second receiving process, and a hiding process of hiding the update information displayed on the display in the displaying process when it is determined that the firmware has been updated in the determining process.

DETAILED DESCRIPTION OF THE EMBODIMENT

<Configuration of Communication System>

Figure 1:
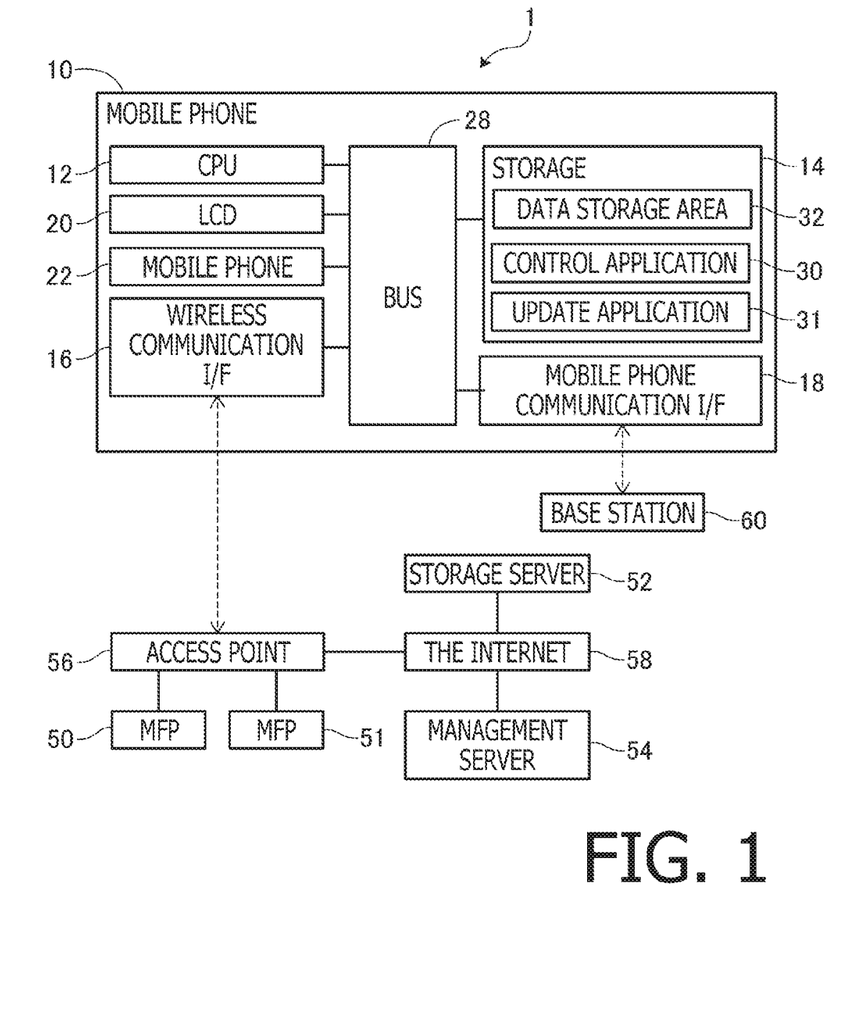
FIG. 1 is a block diagram showing a configuration of a communication system 1 according to an illustrative embodiment.

FIG. 1 is a block diagram showing a configuration of a communication system 1 according to an illustrative embodiment of the present disclosures. The communication system 1 includes a mobile phone 10 (which is an example of a portable terminal), MFP's (abbreviation of Multi-Function Peripheral) 50 and 51 (which are examples of an image processing device set forth in claims), a storage server 52, a management server 54 (which is an example of a server set forth in the claims), an access point 56, the Internet 58, and a base station 60. Each of the MFP's 50 and 51 is configured to execute a copying process, a scanning process, a facsimile transmitting/receiving process, and the like. The storage server 52 is configured to store the latest version of firmware for the MFP's 50 and 51, and supply the same to the MFP's 50 and 51, respectively. The management server 54 is configured to manage the firmware for the MFP's 50 and 51. The access point 56 has functions of a wireless LAN (abbreviation of a Local Area Network) access point and a router. It is noted that the storage server 52 and the management server 54 are connected to the Internet 58, and configured to communicate with an external device through the access point 56.

Next, a configuration of the mobile phone 10 will be described. The mobile phone 10 mainly has a CPU (abbreviation of a Central Processing Unit) 12 (which is an example of a computer set forth in the claims), a storage 14, a wireless communication I/F 16 (which is an example of a communication interface set forth in the claims), a mobile phone communication I/F 18, an LCD (abbreviation of a Liquid Crystal Display) 20 (which is an example of a display set forth in the claims), and a touch panel 22. The above-described components are interconnected with each other through a bus 28 so that they can communicate with each other.

The wireless I/F 16 is configured to execute a Wi-Fi (registered trademark of wireless Alliance) method (also referred to as WF method) wireless communication in accordance with standards of IEEE 802.11 or equivalent standards. That is, when the mobile phone 10 accesses the access point 56 and is in a state where the WF method wireless communication can be performed, the mobile phone 10 is capable of performing a data communication with the MFP's 50 and 51, the storage server 52 and the management server 54 through the access point 56.

The mobile phone communication I/F 18 is configured to perform a wireless communication with the base station 60 in accordance with a mobile phone communication method. Thus, when the mobile phone 10 is in a state to perform wireless communication in accordance with the mobile phone communication method, the mobile phone 10 can perform a data communication through the base station 60.

The CPU 12 executes processes in accordance with a control application (which is an example of a control program) or an update application 31 stored in the storage 14 (see FIG. 1). The control application 30 is a program causing the MFP's 50 and 51 to executed processes with use of the mobile phone 10. The update application 31 is a program causing the MFP's 50 and 51 to update the firmware thereof to the latest version.

It is noted that, in the following description, the CPU 12 causing a certain event by executing the control application 30 will simply be expressed such that the control application 30 causes the certain event. In other words, there will be a case where an expression "the control application 30 causes a certain event" actually means that "the CPU 12 executing the control program 30 causes the certain event."

As shown in FIG. 1, the storage 14 has a data storage area 32. The data storage area 32 is configured to store data which is necessary when the control application 30 is executed. It is noted that the storage 14 is configured such that a RAM (abbreviation of a Random Access Memory), a ROM (abbreviation of a Read Only Memory), a flash memory, an HDD (abbreviation of Hard Disk Drive), a buffer provided to the CPU 12 are combined.

The LCD 20 has a display screen which displays functions of the mobile phone 10. The touch panel 22 has a touch sensor, and arranged to cover the display screen of the LCD 20. The touch panel 22 detects a close proximity or contact of a finger of the user or a touch pen with respect to the touch panel 22, and outputs an electrical signal in accordance with the detection.

<Operation of Communication System>

Figure 2:
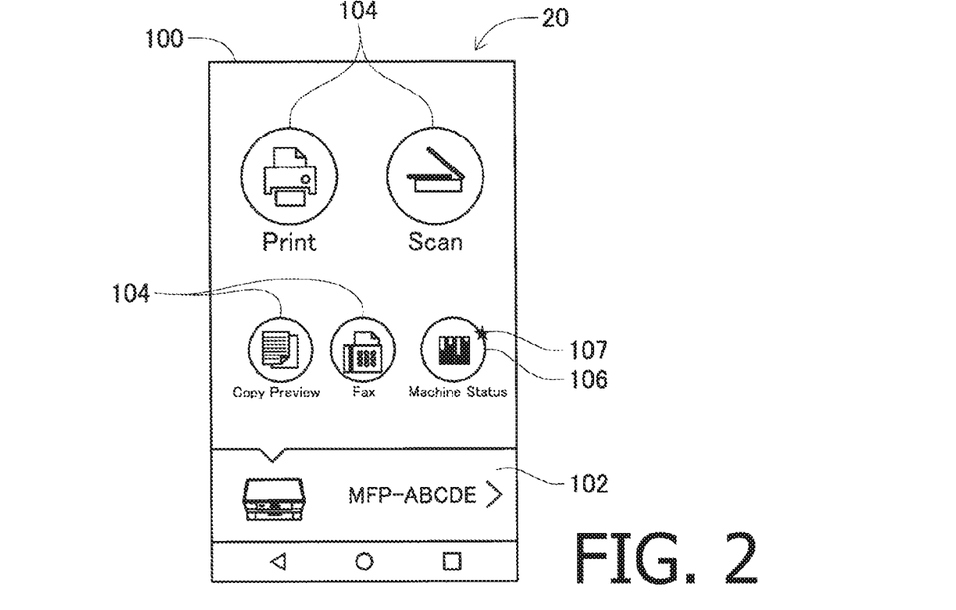
FIG. 2 shows an example of a top screen displayed on a display of a portable terminal device of the communication system shown in FIG. 1.

The communication system 1 is configured such that the MFP's 50 and 51 are caused to execute various processes under control by the mobile phone 10. For example, by executing the control program 30, a top screen 100 as shown in FIG. 2 is displayed on the LCD 20 of the mobile phone 10. The top screen 100 includes a device selection button 102. The device selection button 102 is a button allowing the user to select a device which is to execute various processes under control of the mobile phone 10. In response to the user operation of the device selection button 102, a device selection screen (not shown) will be displayed on the LCD 20.

Typically, on the device selection screen, names of the devices which can communicate with the mobile phone 10 are displayed so that the user can select any one of the displayed devices. According to the illustrative embodiment, the mobile phone 10 is configured to communicate with two MFP's 50 and 51. Therefore, on the device selection screen, the names of the two MFP's 50 and 51 are displayed such that the user can select either of the two MFP's 50 and 51. When the user has selected one of the two MFP's 50 and 51, the top screen 100 is displayed again on the LCD 20. At this stage, the name of the MFP 50 or 51 selected by the user (hereinafter, referred to as a selected device) is displayed on the device selection button 102 of the top screen 100.

On an upper side with respect to the device selection button 102, multiple execution buttons 104 for starting respective processes which can be executed in the selected device, and a status confirmation button 106 are displayed. When one of the multiple execution buttons 104 displayed on the top screen 100 is operated by the user, an instruction corresponding to the operated execution button 104 is transmitted to the selected device through the wireless communication I/F 16. Then, the selected device executes the process in accordance with the instruction received from the mobile phone 10. As above, in the communication system 1, it is possible to cause the MFP 50 or 51 to execute various processes using the mobile phone 10.

According to the communication system 1, when the latest version of the firmware for the selected device has been released, in response to an instruction from the mobile phone 10 to the selected device, updating of the firmware is performed in the selected device. Specifically, according to the illustrative embodiment, as the control application 30 is executed, a request for information on a version of the firmware currently installed in the selected device (hereinafter, referred to as current version information—which is an example of second version information set forth in the claims) is transmitted from the mobile phone 10 to the selected device. In response to receipt of such a request (i.e., a request for the current version information), the selected device transmits the current version information to the mobile phone 10. When the current version information is received, the mobile phone 10 stores the same in the data storage area 32. Then, the mobile phone 10 transmits the current version information and information for identifying a model type of the selected device (hereinafter, referred to as device identification information) to the management server 54 as an inquiry whether update of the firmware for the selected device can be executed (hereinafter, referred to as an update inquiry).

In the management server 54, information on the latest version of the firmware (hereinafter, referred to as the latest version information) is stored for each model of the devices. The management server 54 identifies a model name of the selected device which is identified based on the device identification information received from the mobile phone 10, and then, identifies the latest version information corresponding to the thus identified model name. Next, the management server 54 determines whether the version of the firmware currently installed in the selected device is equal to or newer than the version of the firmware stored in the management server 54 based on the identified latest version information and the current version information received from the mobile phone 10. That is, the management server 54 determines whether the version indicated by the current version information, which is received from the selected device via the mobile phone 10, is equal to or newer than the version indicated by the latest version information or not.

When the version of the firmware installed in the selected device is equal to or newer than the version of the firmware stored in the management server 54, information indicating that the firmware of the selected device has been updated to the firmware of the latest version (hereinafter, referred to as update-applied information) is transmitted from the management server 54 to the mobile phone 10. When the version of the firmware installed in the selected device is older than the version of the firmware stored in the management server 54, the latest version information is transmitted from the management server 54 to the mobile phone 10.

Figure 3:
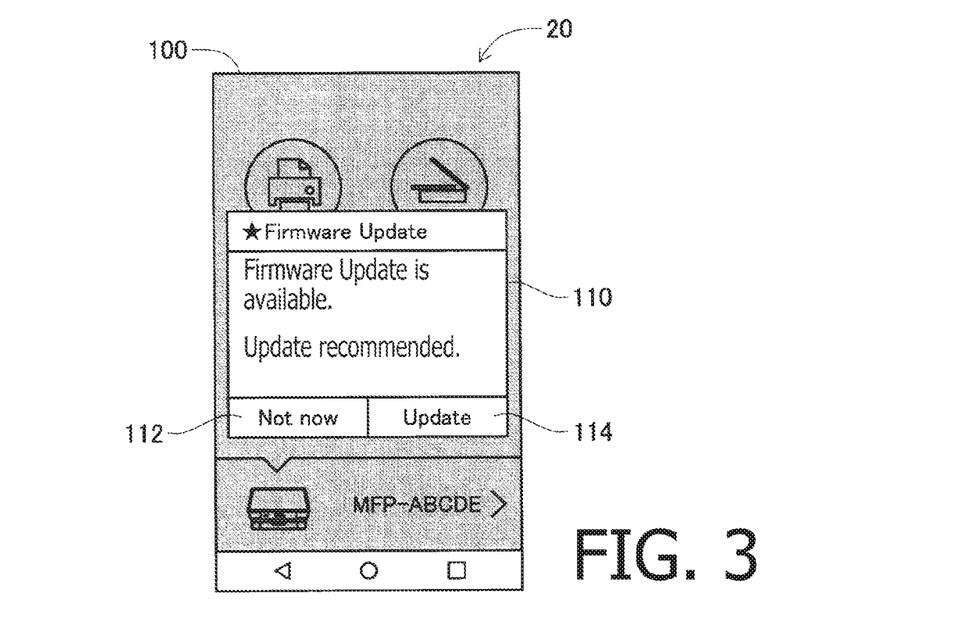
FIG. 3 shows an example of a notifying dialogue displayed on the display of the portable terminal device.
Figure 4:
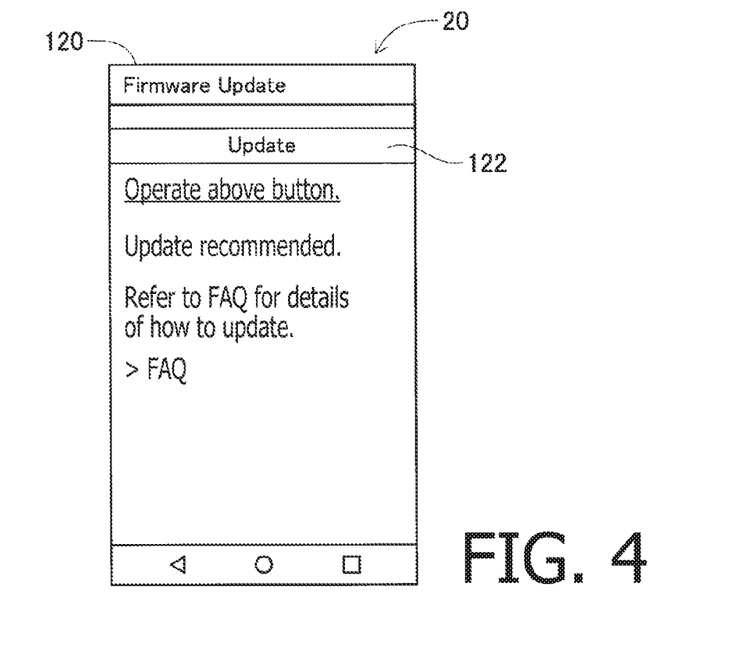
FIG. 4 shows an example of an update notifying screen displayed on the display of the portable terminal device.

When the latest version information is received, the mobile phone 10 stores the same in the data storage area 32, and displays a notifying dialogue 110 on the top screen 100, as shown in FIG. 3. On the notifying dialogue 110, it is indicated that the firmware of the selected device can be updated to the latest version. Further, in the notifying dialogue 110, a cancel button 112 and an update button 114 are included as shown in FIG. 3. When the update button 114 is operated, an update screen 120 as shown in FIG. 4 is displayed on the LCD 20. On the update screen 120, an execution button 122 is displayed. The update screen 120 also notifies that the firmware of the selected device will be updated to the latest version by operating the execution button 122.

When the user operates the execution button 122 in the update screen 120, the update application 31 is started. The update application 31 as started transmits a firmware updating instruction to update the firmware to the selected device through the communication OF 16. When the firmware updating instruction is received, the selected device communicates with the storage server 52 and obtains the latest version of the firmware from the storage server 52. Then, the selected device updates the firmware by installing the thus obtained latest-version firmware in itself. As described above, in the communication system 1, when the latest version of firmware of the selected device has been released, an instruction to update the firmware is transmitted from the mobile phone 10 to the selected device, and updating of the firmware is performed in the selected device.

When the user operates the cancel button 112 in the update screen 110 (see FIG. 2), the update of the firmware in the selected device will not be executed at this time, and the notifying dialogue 110 is hidden. That is, when the user does not willing the firmware to be updated and operates the cancel button 112, the notifying dialogue 110 is hidden and, as shown in FIG. 2, the top screen 100 is displayed on the LCD 20.

In the mobile phone 10 according to the illustrative embodiment, notification, which notifies that the firmware can be updated to the newer version, (hereinafter, referred to as firmware notification) is displayed by means of a badge indication and a message indication in addition to the notifying dialogue 110. Specifically, when the mobile phone 10 has received the latest version information from the management server 54, a star-shaped badge 107 is displayed on an upper-right part of the status confirmation button 106 in the top screen 100 as shown in FIG. 2. The star-shaped badge 107 is the firmware notification, and indicates that the latest version of firmware for the selected device has been released. According to such a configuration, the user can recognize that the firmware of the selected device can be updated to the latest version of firmware simply by viewing the top screen 100 as the star-shaped badge 107 is displayed on the status confirmation button 16 displayed on the top screen 100.

Figure 5:
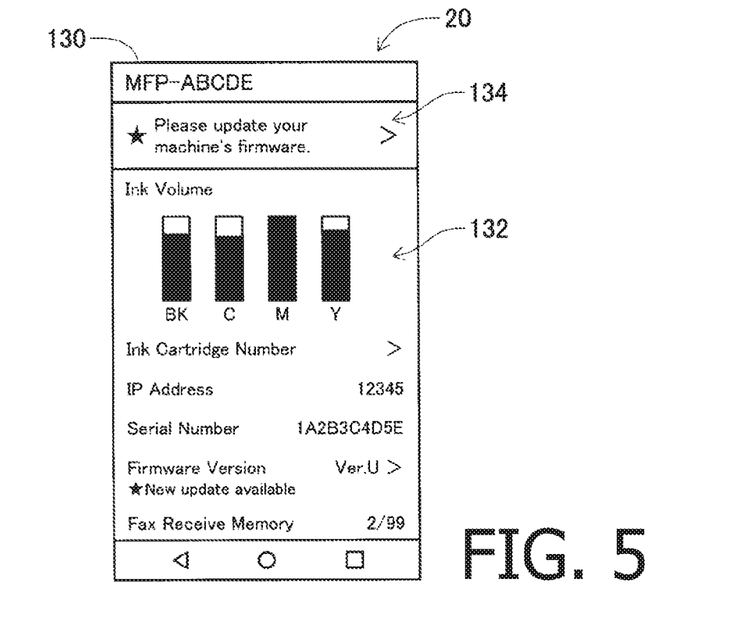
FIG. 5 shows an example of a status screen displayed on the display of the portable terminal device.

When the status confirmation button 106 in the top screen 100 is operated, a status screen 130 as shown in FIG. 5 is displayed on the LCD 20. On the status screen 130, a status displaying area 132 is defined. In the status displaying area 132, status information of the selected device is displayed. The status information includes information regarding remaining amount of the ink used in the selected device, information regarding the type of the ink used in the selected device, information regarding the IP address of the selected device, and the like. It is noted that, in response to an inquiry from the mobile phone 10 to the selected device, the mobile phone 10 obtains the status information from the selected device. For example, the mobile phone 10 periodically transmits a request for the status information to the selected device at an every particular period, and receives the status information which is transmitted from the selected device in response to the request transmitted by the mobile phone 10.

On an upper part of the status screen 130, a message displaying area 134 is defined (see FIG. 5). In the message displaying area 134, the firmware notification, that is a message notifying release of the latest version of firmware of the selected device is displayed. With the above configuration, the user can also recognize that the firmware of the selected device can be updated to the newer version of the firmware through the status screen 130. It is noted that the message displaying area 134 has a function as an operation button. That is, when the message displaying area 134 is operated, the update screen 120 as shown in FIG. 4 is displayed on the LCD 20. Thereafter, when the execution button 122 of the update screen 120 is operated, update of the firmware of the selected device is performed as described above.

As described above, in the mobile phone 10, when the update button 114 of the notifying dialogue 110 is operated, or when the message displaying area 134 displaying the firmware notification of the status screen 130 is operated, the update screen 120 is displayed on the LCD 20. Thereafter, when the execution button 122 is operated, update of the firmware is executed in the selected device.

It is noted that the firmware notification in the notifying dialogue 110, in the top screen 100 and in the status screen 130 (i.e., notification of information, which will be referred to as update notification information hereinafter, indicating that the firmware of the selected device can be updated to the latest version) is kept displayed until update of the firmware is performed in the selected device. That is, when it is confirmed that the firmware has been updated in the selected device, it is set that the update notification information will not be displayed. According to the conventional method, in such case, whether the firmware of the selected device has been updated or not is confirmed based on results of inquiries transmitted to both the selected device and the management server 54.

Specifically, according to the conventional method, an inquiry concerning the current version information is transmitted from the mobile phone 10 to the management server 54, and an inquiry concerning update is transmitted from the mobile phone 10 to the management server 54 every time when a particular period has elapsed according to the above-described procedure. Therefore, when the update of the firmware has been executed in the selected device, the mobile phone 10 receives the current version information of the updated firmware from the selected device as a replay to the inquiry concerning the current version information. Thereafter, when the mobile phone 10 transmits the current version information to the management server 54 as the update inquiry, the management server 54 determines that the firmware of the selected device has been updated to the latest version, and transmits the update-applied information to the mobile phone 10. At this stage, when the mobile phone 10 receives the update-applied information, it is set that the update notification information will not be displayed. As above, according to the conventional method, based on the results of inquiries to both the selected device and the management server 54, update of the selected device is confirmed, and thereafter, it is set that the update notification information will not be displayed.

However, to the management server 54, a plurality of inquiries from a plurality of mobile terminals other than the mobile phone 10 are transmitted. Therefore, if the period for transmitting the inquiries to both the selected device and the management server 54 is relatively short (e.g., 30 seconds), load to the management server 54 may increase too much and an appropriate communication between the mobile phone 10 and the management server 54 may not be ensured. If the period for transmitting the inquiries to both the selected device and the management server 54 is relatively long, however, a period for checking necessity of updating becomes too long. In such a case, even though the updating has been completed, the update notification information will be kept displayed for a relatively long period. For example, if the period for transmitting the inquiries to both the selected device and the management server 54 is one week, even if the user performs updating of the selected device immediately in accordance with the currently displayed update notification information, the confirmation of completion of update will be executed one week later. Therefore, even though the updating has been completed, the update notification information will be kept displayed for about one week, which causes the user to feel inappropriate.

In consideration of the above problem, according to the illustrative embodiment, the period for transmitting the inquiries to both the selected device and the management server 54 is set to be relatively long. Additionally, an inquiry only to the selected device is performed at a short period. Then, based on the results of the inquiries transmitted to both the selected device and the management server 54, and the result of the inquiry transmitted only to the selected device, the update of the firmware in the selected device is checked.

Specifically, the inquiries to both the selected device and the management server 54 are transmitted at every one week, while the inquiry only to the selected device is additionally transmitted at every 30 seconds. Thus, when the mobile phone 10 receives the latest version information from the management server 54 in response to the inquiries transmitted to both the selected device and the management server 54, the update notification information is displayed on the LCD 20. The next inquiries to both the selected device and the management server 54 are performed in one week.

It is noted that, within the one-week period, the inquiry only to the selected device is performed at every 30 seconds. When the mobile phone 10 receives the current version information which is transmitted from the selected device in response to the inquiry (hereinafter, referred to as a received current version information), the mobile phone 10 compares the received current version information with the current version information stored in the data storage area 32 (hereinafter, referred to as a stored current version information).

When the inquiries have been transmitted to both the selected device and the management server 54, the mobile phone 10 has received the current version information from the management server 54 and stored the current version information in the data storage area 32 as the stored current version information. Thereafter, when the inquiry is transmitted only to the selected device and the mobile phone 10 receives the current version information, if update of the firmware of the selected device has not been completed, the received current version information is identical to the stored current version information. Therefore, when the received current version information is equal to the stored current version information, it is determined that the update of the firmware of the selected device has not been completed, and the update notification information will be kept displayed.

After the mobile phone 10 has received the current version information from the management server 54 and stored the same as the stored current version information in response to the inquiries transmitted to both the selected device and the management server 54, if update of the firmware of the selected device has been completed, the received current version information is not identical to the stored current version information. Therefore, when the received current version information is different from the stored current version information, it is determined that the update of the firmware of the selected device has been completed, and the update notification information will be hidden.

As described above, according to the illustrative embodiment, the period at which the mobile phone 10 transmits the inquiries to both the selected device and the management server 54 is relatively long, while the period at which the mobile phone 10 transmits an inquiry only to the selected device is relatively short. Then, based on the current version information, which was received in response to the inquiries transmitted to both the selected device and the management server 54 and stored in the data storage area 23, and the current version information (i.e., the received current version information), which is received in response to the inquiry transmitted only to the selected device, it is determined whether the firmware of the selected device has been updated or not. When the received current version information is different from the stored current version information, the update notification information is hidden since the firmware of the selected device has been completed. Accordingly, load to the management server 54 can be suppressed since the inquiry is made at a relatively long interval, and update status of the firmware of the selected device can be checked at a relatively short interval.

It is noted that, according to the mobile phone 10, the update of the selected device could be checked according to a method different from one described above. Specifically, similar to the above described method, the period for transmitting the inquiries to both the selected device and the management server 54 is set to be relatively long (e.g., one week). Additionally, an inquiry only to the selected device is performed at a short period (e.g., 30 seconds). Then, when the mobile phone 10 receives the latest version information from the management server 54 in response to the inquiries transmitted to both the selected device and the management server 54, the update notification information is displayed on the LCD 20. Thereafter, the inquiries to both the selected device and the management server 54 are transmitted at every one week, while the inquiry only to the selected device is additionally transmitted at every 30 seconds.

When the mobile phone 10 receives the current version information from the selected device (i.e., the received current version information) in response to the inquiry, which is transmitted only to the selected device, the mobile phone 10 compares the received current version information with the latest version information stored in the data storage area 32.

After the inquiries have been transmitted to both the selected device and the management server 54, and the mobile phone 10 has received the latest version information from the management server 54 and stored the same in the data storage area 23, if update of the firmware of the selected device has not been completed, the version of the firmware represented by the received current version information is older than version represented by the latest firmware information. Therefore, when the version represented by the received current version information is older than the version represented by the latest version information, it is determined that the update of the firmware of the selected device has not been completed, and the update notification information is kept displayed.

After the inquiries have been transmitted to both the selected device and the management server 54, and the mobile phone 10 has received the latest version information from the management server 54 and stored the same in the data storage area 23, if update of the firmware of the selected device has been completed, the version of the firmware represented by the received current version information is identical to the version represented by the latest firmware information.

It should be noted that there could be a case where the firmware may further be updated after the mobile phone 10 has received the latest version information from the management server 54, and before the update of the firmware of the selected device is performed. In such a case, the version of the firmware having been updated in the selected device (i.e., the version represented by the received current version) becomes newer than the version of the firmware represented by the latest version information.

Therefore, when the version represented by the received current version information is equal to or newer than the version represented by the version represented by the latest version information, it is determined that the update of the firmware of the selected device has been completed, and the update notification information is hidden.

According to the other method, which is different from the firstly-described method, the period to transmit the inquiries to both the selected device and the management server 54 is made relatively long, while the period to transmit the inquiry only to the selected device is made relatively short. Then, based on the latest version information, which is received in response to the inquiries to both the selected device and the management server 54, and the received current version information, which is received in response to the inquiry only to the selected device, it is determined whether the update of the firmware of the selected device has been completed. When the firmware version represented by the received current version information is equal to or newer than the firmware version represented by the latest version information, the update notification information is hidden. According to this configuration, it is also possible to check the update status of the firmware of the selected device at a relatively short period with suppressing the load to the management server 54.

In the above description, it is explained that the inquiries to both the selected device and the management server 54 are transmitted at one-week period. It is noted, however, there is a case where the inquiries to both the selected device and the management server 54 are not transmitted even if more than one week has elapsed since the previous inquiries to both the selected device and the management server 54 were transmitted.

Unless the firmware is updated in the selected device, the current version information transmitted from the selected device to the mobile phone 10 remains unchanged. In such a situation, even if the inquiries are transmitted to both the selected device and the management server 54, it is always determined in the management server 54 that the version of the firmware installed in the selected device is older than the version of the firmware stored in the management server 54, namely, the version represented by the current version is older than the version represented by the latest version information. As a result, the latest version information is always transmitted from the management server 54 to the mobile phone 10. That is, unless the firmware of the selected device is updated, when the inquiries are transmitted to both the selected device and the management server 54, the management server 54 always transmits the latest version information. Therefore, unless the firmware is updated in the selected device, the inquiries to both the selected device and the management server 54 will be wasted.

In this regard, the inquiries to both the selected device and the management server 54 will not be transmitted even if one week has elapsed since the inquiries to both the selected device and the management server 54 were previously transmitted, unless update of the firmware is confirmed based on the received current version information. Thus, according to the above configuration, frequency of inquiries transmitted to the management server 54 can be further reduced, thereby load to the management server 54 being further suppressed.

It is also noted that there is a case where the inquiries to both the selected device and the management server 54 are transmitted before one week has elapsed since the inquiries to both the selected device and the management server 54 were previously transmitted. According to the illustrative embodiment, the mobile phone 10 is configured to communicate with the two MFP's 50 and 51 (see FIG. 1), and as mentioned above, the user can select arbitrary one of the two MFP's 50 and 51 as the selected device through the device selection screen. When the device is selected through the device selection screen, it is necessary to check at an early stage whether the firmware of the selected device can be updated. In this regard, when a device is selected through the device selection screen, the inquiries are transmitted to both the selected device and the management server 54 even if one week has not passed since the inquiries to both the selected device and the management server 54 were previously transmitted.

It is further noted that there is a case where a period for transmitting the inquiries to both the selected device and the management server 54 is shortened. When the inquiries are transmitted to both the selected device and the management server 54, there could be a situation where the communication between the mobile phone 10 and the management server 54 cannot be performed due to a bad communication condition. In such a situation, that is, when the communication between the mobile phone 10 and the management server 54 has not been performed, if the inquiries to both the selected device and the management server 54 are not transmitted for another one week, whether update of the firmware is available or not cannot be checked for a relatively long time. In order to avoid such a situation, according to the illustrative embodiment, when the inquiries are transmitted to both the selected device and the management server 54, but the communication between the mobile phone 10 and the management server 54 has not be performed, the period for transmitting the inquiries to both the selected device and the management server 54 is shortened from one week to three days. With this configuration, a situation where whether update of the firmware is available or not cannot be checked for a relatively long time can be avoided. It is noted that when the inquiries to both the selected device and the management server 54 have been transmitted and the communication between the mobile phone 10 and the management server 54 has been performed successfully, the period may be restored to one week.

<Control Program>

The above-described operation of the mobile phone 10 is performed as a control application 30 is executed by the CPU 12. Referring to FIGS. 6-9, the operation when the control application 30 is executed will be described.

Figure 6:
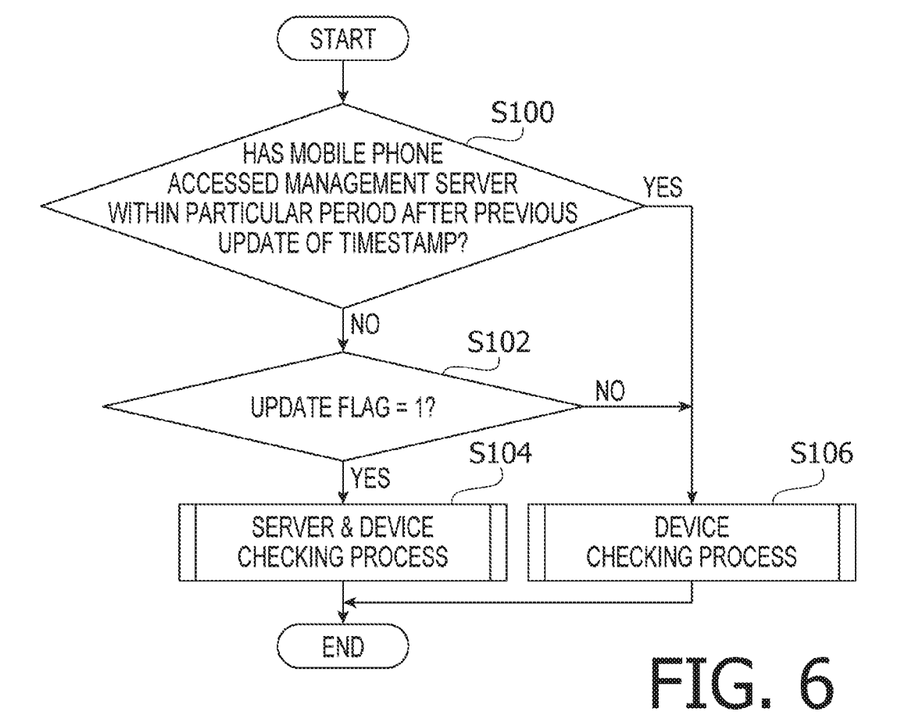
FIG. 6 is a flowchart illustrating a controlling application according to the illustrative embodiment.

A process shown in FIG. 6 is executed at every period which is equal to the period for transmitting an inquiry only to the selected device (e.g., 30 seconds, according to the illustrative embodiment). As shown in FIG. 6, when the process shown in FIG. 6 is started, the CPU 12 determines whether the mobile phone 10 has accessed to the management server 54 within a particular period (S100). It is noted that the particular period referred to in S100 is equal to a period at which the inquiries to both the selected device and the management server 54 are transmitted (i.e., the particular period being one week).

If it is determined that the mobile phone has not accessed the management server 54 for the particular period or more after the previous update of the timestamp (S100: NO), the CPU 12 determines whether an update flag is set to one (S102). It is noted that the update flag is a flag indicating whether the update of the firmware has been completed in the selected device. When the update flag is set to one (1), the update of the firmware has been completed, while when the update flag is set to zero (0), the update of the firmware has not been completed. It is noted that an initial value of the update flag is one (1).

Figure 7:
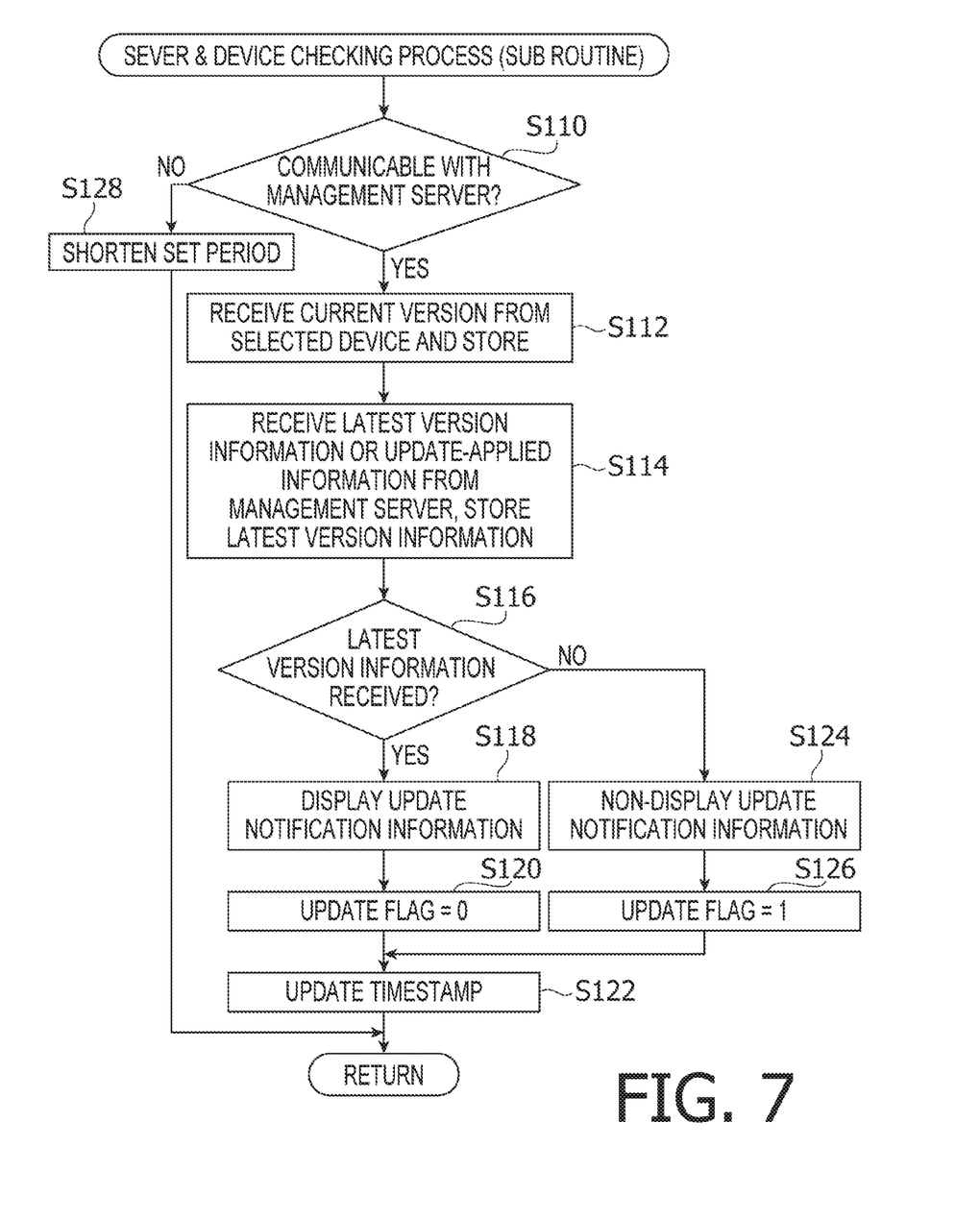
FIG. 7 is a flowchart illustrating a server & device checking process which is a sub routine called in the process shown in FIG. 6.

When the update flag is set to one (S102: YES), a server & device checking process, which is a sub routine shown in FIG. 7, is executed (S104). In the server & device checking process, the CPU 12 determines whether the mobile phone 10 can communicate with the management server 54 (S110). When the mobile phone 10 can communicate with the management server 54 (S110: YES), the mobile phone 10 executes transmission of an inquiry of the current version information to the selected device. Then, the mobile phone 10 receives the current version information from the selected device and stores the current version information in the storage area 32 (S112). Next, the mobile phone 10 transmits an update inquiry to the management server 54, and receives, from the management server 54, the latest version information or the update-applied information. When the latest version information is received, the mobile phone 10 stores the same in the storage area 32 (S114).

Then, the CPU 12 determines whether the information received in S114 is the latest version information (S116). When the received information is the latest version information (S116: YES), the update notification information is displayed (S118). Then, the update flag is set to zero (0) in S120. In S122, the timestamp is updated to the current time, and the server & device checking process is terminated.

When the information received in S116 is not the latest version information (S116: NO), the update notification information is hidden (S124), and the update flag is set to one (1) in S126. Thereafter, the timestamp is updated to the current time (S122), and the server & device checking process is terminated.

When it is determined that the mobile phone 10 cannot communicate with the management server 54 (S110: NO), the setting period is reduced from one week to three days (S128), and the server and device checking process is terminated.

Figure 8:
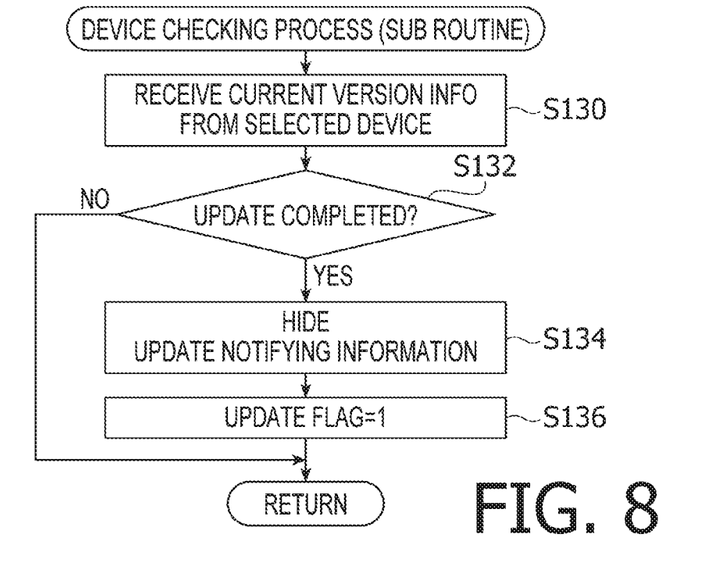
FIG. 8 is a flowchart illustrating a device checking process which is a sub routine called in the process shown in FIG. 6.

When access to the management server 54 is executed during a setting period after the timestamp has been updated (S100: NO), or when the update flag is set to zero (0) (S102: NO), a device checking process is executed (S106). In the device checking process, as shown in FIG. 8, the mobile phone 10 transmits an inquiry for the current version information to the selected device, and receives the current version information from the selected device (S130). Next, based on one of the current version information, which is stored in S112 of the server & device checking process, and the latest version information stored in S114, and the current version information received in S130, the CPU 12 determines whether the firmware of the selected device has been completed (S132).

When the update of the firmware of the selected device has been completed (S132: YES), the update notification information is hidden and set not to be displayed (S134). Then, the update flag is set to one (1) in S136, and the device checking process is terminated. When the update of the firmware of the selected device has not been completed (S132: NO), S134 and S136 are skipped, and the device checking process is terminated. When the device checking process is terminated, the process shown in FIG. 6 is also terminated.

Figure 9:
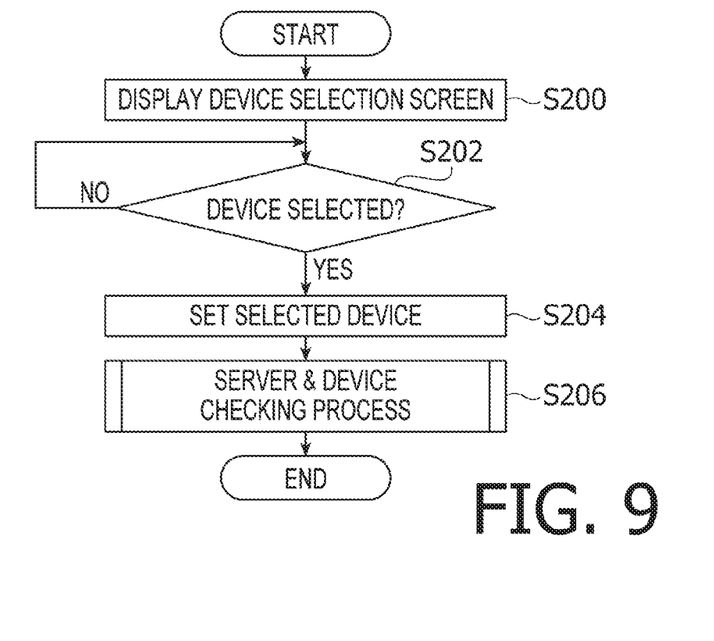
FIG. 9 is a flowchart illustrating a device selection process which is executed when a top button shown in the top screen is operated.

Next, a process shown in FIG. 9 will be described. The process shown in FIG. 9 is executed when the device selection button 102 on the top screen 100 is operated. When the process shown in FIG. 9 starts, a device selection screen is displayed on the LCD 20 (S200). Then, the CPU 12 determines whether a device has been selected on the device selection screen (S202). When no device has been selected on the device selection screen (S202: NO), S202 is repeated. When it is determined that a device has been selected on the device selection screen (S202: YES), the device selected on the device selection screen is set as the selected device (S204). Thereafter, the sever & device checking process (see FIG. 7) is executed (S206). Since the server & device checking process has already been described, it will not be described here again. When the server & device checking process has been terminated, the process shown in FIG. 9 is terminated.

It is noted that S112 and S114 executed by the CPU 12 shown an example of a first receiving process set forth in claims. S118 executed by the CPU 12 is an example of a displaying process set forth in the claims. S130 executed by the CPU 12 is an example of a second receiving process set forth in the claims. S132 executed by the CPU 12 is an example of a determining process set forth in the claims. S134 executed by the CPU 12 is an example of a hiding process set forth in the claims. S202 executed by the CPU 12 is an example of a selection process set forth in the claims.

It is noted that the above-described embodiment is merely an illustrative embodiment, which can be modified/improved in various ways based on knowledge of person skilled in the art. For example, according to the above-described illustrative embodiment, the management server 54 is configured to determine whether the firmware of the selected device can be updated based on the current version information and the latest version information. This configuration may be modified such that the mobile phone 10 is configured to determine whether the firmware of the selected device can be updated based on the current version information and the latest version information. Specifically, the mobile phone 10 may be configured to transmit inquiries to both the selected device and the management server 54 to receive the current version information from the selected device and the latest version information from the management server 54, and determine whether update of the firmware of the selected device can be performed based on the thus received current version information and the latest version information.

Further, according to the above-described illustrative embodiment, the update application 31 transmits the firmware updating instruction to the selected device, thereby update of the firmware of the selected device being performed. Such a configuration may be modified such that the control application 30 transmits a firmware updating instruction to the selected device to update the firmware of the selected device.

According to the above-described illustrative embodiment, the processes shown in FIGS. 6-9 are executed by the CPU 12. These processes are not necessarily be executed by the CPU 12, but by an ASIC (application specific integrated circuit) or other logic integrated circuits. Alternatively, the processes may be executed by cooperation of the CPU 12, ASIC and the other logic integrated circuit.

What is claimed is:

1. A non-transitory computer-readable recording medium storing instructions controlling operation of a mobile terminal having a controller, a storage, a display and a communication interface configured to communicate with an image processing device and a server, the server storing first version information concerning a version of a firmware of the image processing device for update, the mobile terminal being configured to transmit an instruction concerning image processing to the image processing device through the communication interface, the instructions cause, when executed by the controller, the mobile terminal to execute:
   periodically repeating a first process at an elapse of a first repeating period with accessing the server; and
   periodically repeating a second process at an elapse of a second repeating period without accessing the server on condition that update information is displayed, the update information indicating that the firmware of the image processing device can be updated, the first repeating period being longer than the second repeating period such that the second process is executed repeatedly during the first repeating period as long as the update information is displayed,
   the first process comprising:
   receiving second version information concerning a version of the firmware installed in the image processing device from the image processing device through the communication interface and the first version information from the server through the communication interface;
   storing the second version information and the first version information in the storage;
   determining, based on the second version information and the first version information stored in the storage, whether a version indicated by the second version information is older than a version indicated by the first version information; and
   displaying the update information indicating that the firmware of the image processing device can be updated when it is determined that the version indicated by the second version information is older than the version indicated by the first version information,
   the second process comprises:
   receiving current version information concerning a version of the firmware currently installed in the image processing device from the image processing device through the communication interface, without receiving the first version information from the server;
   determining whether the firmware currently installed in the image processing device is a newer version with respect to a version represented by the second version information stored in the storage based on one of the first version information and the second version information stored in the storage, and the current version information received; and
   hiding the update information which has been displayed on the display when it is determined that the firmware currently installed in the image processing device is the newer version.

2. The non-transitory recording medium according to claim 1,
   wherein, the mobile terminal receives the current version information from the image processing device through the communication interface after the update information is displayed.

3. The non-transitory recording medium according to claim 1,
   wherein the mobile terminal determines that the firmware currently installed in the image processing device is the newer version when a version represented by the second version information received and a version represented by the current version information are different.

4. The non-transitory recording medium according to claim 1,
   wherein the mobile terminal determines that the firmware currently installed in the image processing device is the newer version when a version represented by the current version information is equal to or newer than a version represented by the first version information.

5. The non-transitory recording medium according to claim 1,
   wherein the mobile terminal has a user interface through which a user input is received,
   wherein the communication interface is configured to communicate with a plurality of image processing devices,
   wherein the instructions cause, when executed by the controller, to execute selecting one of the plurality of image processing devices through the user interface, and
   wherein, when the one of the plurality of image processing devices has been selected, the first version information and the second version information are received even if the first repeating period has not elapsed.

6. The non-transitory recording medium according to claim 1,
   wherein the first repeating period is shortened when the mobile terminal is not communicatively connected to the server through the communication interface.

7. The non-transitory recording medium according to claim 6,
   wherein the mobile terminal has a user interface through which a user input is received,
   wherein the communication interface is configured to communicate with a plurality of image processing devices,
   wherein the instructions cause, when executed by the controller, to execute selecting one of the plurality of image processing devices through the user interface, and
   wherein, when the one of the plurality of image processing devices has been selected, the first version information and the second version information are received even if the first repeating period has not elapsed.

8. A mobile terminal comprising:
   a display;
   a storage;
   a communication interface configured to communicate with an image processing device and a server, the server storing first version information concerning a version of a firmware of the image processing device for update, the mobile terminal being configured to transmit an instruction concerning image processing to the image processing device through the communication interface;
a controller; and
a non-transitory recording medium storing computer-readable instructions, the instructions, when executed by the controller, causing the mobile terminal to perform:
periodically repeating a first process at an elapse of a first repeating period with accessing the server; and
periodically repeating a second process at an elapse of a second repeating period without accessing the server on condition that update information is displayed, the update information indicating that the firmware of the image processing device can be updated, the first repeating period being longer than the second repeating period such that the second process is executed repeatedly during the first repeating period as long as the update information is displayed,
the first process comprising:
receiving second version information concerning a version of the firmware installed in the image processing device from the image processing device through the communication interface and the first version information from the server through the communication interface;
storing the second version information and the first version information in the storage;
determining, based on the second version information and the first version information stored in the storage, whether a version indicated by the second version information is older than a version indicated by the first version information; and
displaying the update information indicating that the firmware of the image processing device can be updated when it is determined that the version indicated by the second version information is older than the version indicated by the first version information,
the second process comprises:
receiving current version information concerning a version of the firmware currently installed in the image processing device from the image processing device through the communication interface, without receiving the first version information from the server;
determining whether the firmware currently installed in the image processing device is a newer version with respect to a version represented by the second version information stored in the storage based on one of the first version information and the second version information stored in the storage, and the current version information; and
hiding the update information which has been displayed on the display when it is determined that the firmware currently installed in the image processing device is the newer version.

9. A method of controlling an operation of a mobile terminal having a display, a storage and a communication interface configured to communicate with an image processing device and a server, the server storing first version information concerning a version of a firmware of the image processing device for update, the mobile terminal being configured to transmit an instruction concerning image processing to the image processing device through the communication interface,
the method comprising:
periodically repeating a first process at an elapse of a first repeating period with accessing the server; and
periodically repeating a second process at an elapse of a second repeating period without accessing the server on condition that update information is displayed, the update information indicating that the firmware of the image processing device can be updated-, the first repeating period being longer than the second repeating period such that the second process is executed repeatedly during the first repeating period as long as the update information is displayed,
the first process comprising:
receiving second version information concerning a version of the firmware installed in the image processing device from the image processing device through the communication interface and the first version information from the server through the communication interface;
storing the second version information and the first version information in the storage;
determining, based on the second version information and the first version information stored in the storage, whether a version indicated by the second version information is older than a version indicated by the first version information;
displaying the update information indicating that the firmware of the image processing device can be updated when it is determined that the version indicated by the second version information is older than the version indicated by the first version information,
the second process comprising:
receiving current version information concerning a version of the firmware currently installed in the image processing device from the image processing device through the communication interface, without receiving the first version information from the server;
determining whether the firmware currently installed in the image processing device is a newer version with respect to a version represented by the second version information stored in the storage based on one of the first version information and the second version information stored in the storage, and the current version information; and
hiding the update information which has been displayed on the display when it is determined that the firmware currently installed in the image processing device is the newer version.

* * * * *